US012288639B2

(12) United States Patent
Wakabayashi

(10) Patent No.: US 12,288,639 B2
(45) Date of Patent: Apr. 29, 2025

(54) COIL COMPONENT AND METHOD OF MANUFACTURING THE SAME

(71) Applicant: TAIYO YUDEN CO., LTD., Tokyo (JP)

(72) Inventor: Hirotaka Wakabayashi, Tokyo (JP)

(73) Assignee: TAIYO YUDEN CO., LTD., Tokyo (JP)

(*) Notice: Subject to any disclaimer, the term of this patent is extended or adjusted under 35 U.S.C. 154(b) by 0 days.

(21) Appl. No.: 18/427,136

(22) Filed: Jan. 30, 2024

(65) Prior Publication Data

US 2024/0170199 A1 May 23, 2024

Related U.S. Application Data

(63) Continuation of application No. 17/160,110, filed on Jan. 27, 2021, now Pat. No. 11,923,126.

(30) Foreign Application Priority Data

Jan. 31, 2020 (JP) ................................ 2020-015306

(51) Int. Cl.
*H01F 27/28* (2006.01)
*H01F 27/06* (2006.01)
(Continued)

(52) U.S. Cl.
CPC ............ *H01F 27/29* (2013.01); *H01F 27/06* (2013.01); *H01F 41/02* (2013.01); *H01F 2027/065* (2013.01)

(58) Field of Classification Search
CPC .......... H01F 27/29; H01F 27/06; H01F 41/02; H01F 2027/065; H01F 27/2852;
(Continued)

(56) References Cited

U.S. PATENT DOCUMENTS

2013/0255071 A1 10/2013 Mineuchi et al.
2014/0204502 A1* 7/2014 Chun ...................... H01G 4/30 361/301.4
(Continued)

FOREIGN PATENT DOCUMENTS

EP 0777242 A2 * 4/1997
JP H10-074661 A 3/1998
(Continued)

OTHER PUBLICATIONS

Notice of Reasons for Refusal dated Sep. 5, 2023, issued in corresponding Japanese Patent Application No. 2020-015306 with English translation (11 pgs.).

*Primary Examiner* — Shawki S Ismail
*Assistant Examiner* — Kazi S Hossain
(74) *Attorney, Agent, or Firm* — Pillsbury Winthrop Shaw Pittman, LLP

(57) ABSTRACT

Provided is a coil component less prone to aggregation of metal fillers contained in an external electrode. The coil component includes: a base body; a conductor wound around a coil axis; and an external electrode provided on a surface of the base body and electrically connected to an end portion of the conductor, wherein the external electrode includes an electrode layer containing a plurality of first fillers, a plurality of second fillers, and a resin. Each of the plurality of second fillers has a flat shape. One end of each of said at least one of the plurality of second fillers is in direct contact with and bonded by metallic bond to said at least adjacent one of the plurality of first fillers and/or said at least adjacent one of the plurality of second fillers.

19 Claims, 5 Drawing Sheets

(51) Int. Cl.
*H01F 27/29* (2006.01)
*H01F 41/02* (2006.01)

(58) Field of Classification Search
CPC ...... H01F 1/26; H01F 2017/048; H01F 17/04; H01F 27/292
USPC .......................................... 336/192, 198, 200
See application file for complete search history.

(56) References Cited

U.S. PATENT DOCUMENTS

| | | | | |
|---|---|---|---|---|
| 2014/0292142 | A1* | 10/2014 | Nishisaka | C03C 8/18 336/200 |
| 2015/0334883 | A1* | 11/2015 | Yamamoto | H05K 9/0083 174/377 |
| 2018/0033540 | A1* | 2/2018 | Lee | H01F 41/041 |
| 2022/0139609 | A1* | 5/2022 | Inui | H01F 27/292 336/192 |

FOREIGN PATENT DOCUMENTS

| | | | |
|---|---|---|---|
| JP | H10-154633 | A | 6/1998 |
| JP | 2006-100498 | A | 4/2006 |
| JP | 2007-234330 | A | 9/2007 |
| JP | 2013-211333 | A | 10/2013 |
| JP | 2016-146431 | A | 8/2016 |
| JP | 2018-006501 | A | 1/2018 |

* cited by examiner

COIL COMPONENT AND METHOD OF MANUFACTURING THE SAME

CROSS-REFERENCE TO RELATED APPLICATIONS

This application is a continuation of U.S. patent application Ser. No. 17/160,110 (filed on Jan. 27, 2021), which claims the benefit of priority from Japanese Patent Application Serial No. 2020-15306 (filed on Jan. 31, 2020), the contents of which are hereby incorporated by reference in their entirety.

TECHNICAL FIELD

The present disclosure relates to a coil component and a method of manufacturing the coil component.

BACKGROUND

A conventional coil component such as an inductor typically includes a magnetic base body made of a magnetic material, a conductor provided in the magnetic base body and wound around a coil axis, and an external electrode connected to an end portion of the conductor. Such a coil component is mounted on a substrate, for example, through electric connection between the external electrode and the substrate soldered to each other, for use as a component of various electronic devices. An example of the conventional coil component is disclosed in Japanese Patent Application Publication No. 2013-211333 ("the '333 Publication"). In the coil component of the '333 Publication, the external electrode is formed by heat-treating a conductive paste containing metal fillers and a resin, and the metal fillers contained in the conductive paste have been sintered.

In forming the external electrode using the conductive paste containing metal fillers and a resin, the metal fillers aggregate in the course of heat-curing the resin. As a result, the metal fillers are unevenly distributed to form thick portions and resin portions in the external electrode. The thick portions contain the metal fillers aggregating closely, whereas the resin portions contain almost no metal fillers. Such resin portions form a structural defect of the external electrode. In addition, the thick portions in which the metal fillers aggregate closely and the resin portions have different coefficients of linear expansion, and therefore, the structural defect may expand upon an environmental change. Accordingly, the aggregation of the metal fillers may reduce the strength of the external electrode.

SUMMARY

One object of the present invention is to provide a coil component and a method of manufacturing the coil component less prone to aggregation of the metal fillers contained in the external electrode. Other objects of the present invention will be made apparent through the entire description in the specification.

A coil component according to one embodiment of the present invention comprises: a base body; a conductor wound around a coil axis; and an external electrode provided on a surface of the base body and electrically connected to an end portion of the conductor, wherein the external electrode includes an electrode layer containing a plurality of first fillers, a plurality of second fillers, and a resin, wherein at least a part of the plurality of second fillers is bonded by metallic bond to at least adjacent one of the plurality of first fillers and/or at least adjacent one of the others of the plurality of second fillers, and wherein each of the plurality of second fillers has a flat shape.

In one embodiment of the present invention, each of the plurality of second fillers may have an aspect ratio of 3 or larger.

In one embodiment of the present invention, in a sectional surface of the electrode layer in a thickness direction thereof, an average of maximum particle sizes of the plurality of second fillers may be larger than an average of maximum particle sizes of the plurality of first fillers.

In one embodiment of the present invention, each of the plurality of first fillers may have a spherical shape with an aspect ratio of 2 or smaller.

In one embodiment of the present invention, the external electrode may include a metal film provided between the electrode layer and the end portion of the conductor, and the metal film may be metal-bonded to at least adjacent one of the plurality of second fillers.

In one embodiment of the present invention, the external electrode may include a plating layer provided on the electrode layer, and the plating layer may be metal-bonded to at least adjacent one of the plurality of second fillers.

In one embodiment of the present invention, a long axis direction of each of the plurality of second fillers may be substantially parallel to a direction perpendicular to a thickness direction of the electrode layer.

In one embodiment of the present invention, at least a part of the plurality of second fillers may be metal-bonded to each other with long axes thereof oriented parallel to each other.

In one embodiment of the present invention, a proportion of the resin in the electrode layer may be 60 vol % or smaller.

In one embodiment of the present invention, the electrode layer may be formed from a conductive paste containing first metal particles to be the plurality of first fillers and second metal particles to be the plurality of second fillers, and an average of minimum radii of curvature of the second metal particles may be smaller than an average of minimum radii of curvature of the first metal particles.

One embodiment of the present invention relates to a circuit board comprising any one of the above coil components. One embodiment of the present invention relates to an electronic device comprising the above circuit board.

A method of manufacturing a coil component according to one embodiment of the present invention is a method of manufacturing a coil component including a base body and a conductor wound around a coil axis, the method comprising: preparing a conductive paste containing a plurality of first metal particles and a plurality of second metal particles, the plurality of second metal particles having an average of minimum radii of curvature smaller than that of the plurality of first metal particles; forming a layer of the conductive paste electrically connected to an end portion of the conductor; and heat-treating the plurality of first metal particles and the plurality of second metal particles contained in the conductive paste so as to cause metallic bond.

Advantageous Effects

The present invention provides a coil component and a method of manufacturing the coil component less prone to aggregation of the metal fillers contained in the external electrode.

DESCRIPTION OF THE PREFERRED EMBODIMENTS

Various embodiments of the present invention will be hereinafter described with reference to the accompanying drawings. The constituents common to more than one drawing are denoted by the same reference signs throughout the drawings. For convenience of explanation, the drawings are not necessarily drawn to scale.

Figure 1:
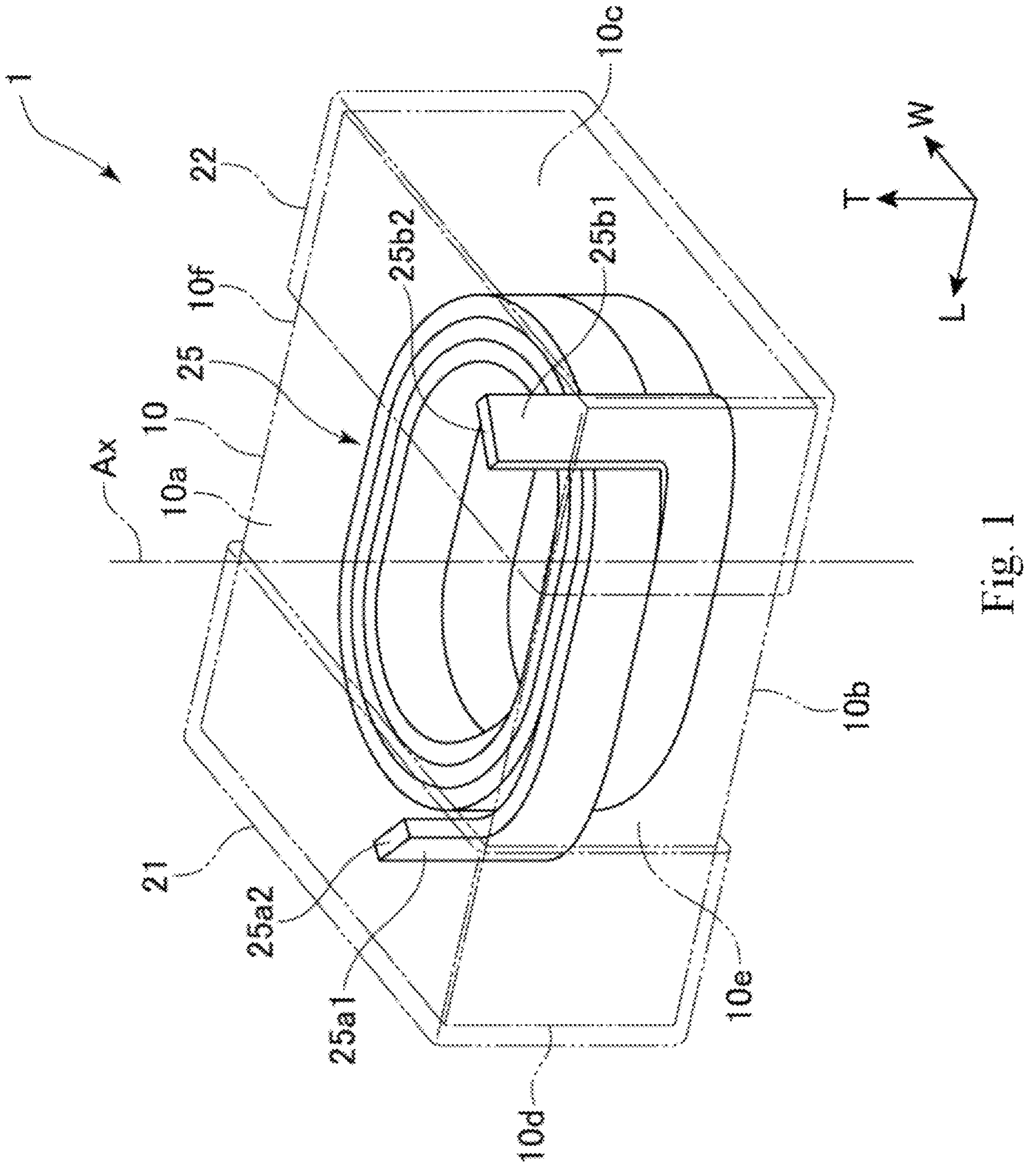
FIG. 1 is a perspective view schematically showing a coil component according to one embodiment of the present invention.

A coil component 1 according to one embodiment of the present invention will be hereinafter outlined with reference to FIG. 1. FIG. 1 is a perspective view schematically showing the coil component 1. As shown in FIG. 1, the coil component 1 includes a base body 10, a coil conductor (a conductor) 25 provided in the base body 10, an external electrode 21 disposed on a surface of the base body 10, and an external electrode 22 disposed on a surface of the base body 10 at a position spaced apart from the external electrode 21.

In this specification, a "length" direction, a "width" direction, and a "height" direction of the coil component 1 correspond to the "L axis" direction, the "W axis" direction, and the "T axis" direction in FIG. 1, respectively, unless otherwise construed from the context.

The coil component 1 is mounted on a circuit board (not shown). The circuit board has two land portions provided thereon. The coil component 1 may be mounted on the circuit board by bonding the external electrodes 21, 22 to the land portions corresponding to the external electrodes 21, 22, respectively. The circuit board can be installed in electronic devices such as smartphones, tablets, game consoles, and various others. The circuit board may also be installed in an electric component of an automobile, which is a sort of electronic device.

The coil component 1 may be applied to inductors, transformers, filters, reactors, and various other coil components having the external electrodes 21, 22 on the surface of the base body 10. The coil component 1 may also be applied to coupled inductors, choke coils, and various other magnetically coupled coil components. Applications of the coil component 1 are not limited to those explicitly described herein.

The base body 10 is made of an insulating material. In one embodiment, the base body 10 is made mainly of a magnetic material and formed in a rectangular parallelepiped shape. In the coil component 1 according to one embodiment of the invention, the base body 10 has a length (the dimension in the L axis direction) of 1.0 mm to 4.5 mm, a width (the dimension in the W axis direction) of 0.5 mm to 3.2 mm, and a height (the dimension in the T axis direction) of 0.5 mm to 5.0 mm. The dimensions of the base body 10 are not limited to those specified herein. The term "rectangular parallelepiped" or "rectangular parallelepiped shape" used herein is not intended to mean solely "rectangular parallelepiped" in a mathematically strict sense.

The base body 10 has a first principal surface 10*a*, a second principal surface 10*b*, a first end surface 10*c*, a second end surface 10*d*, a first side surface 10*e*, and a second side surface 10*f*. These six surfaces define the outer periphery of the base body 10. The first principal surface 10*a* and the second principal surface 10*b* are at the opposite ends in the height direction, the first end surface 10*c* and the second end surface 10*d* are at the opposite ends in the length direction, and the first side surface 10*e* and the second side surface 10*f* are at the opposite ends in the width direction.

As shown in FIG. 1, the first principal surface 10*a* lies on the top side of the base body 10, and therefore, the first principal surface 10*a* may be herein referred to as "the top surface." Similarly, the second principal surface 10*b* may be referred to as "the bottom surface." The coil component 1 is disposed such that the first principal surface 10*a* faces the circuit board, and therefore, the first principal surface 10*a* may be herein referred to as "the mounting surface." The top-bottom direction of the coil component 1 mentioned herein refers to the top-bottom direction in FIG. 1.

Figure 2:
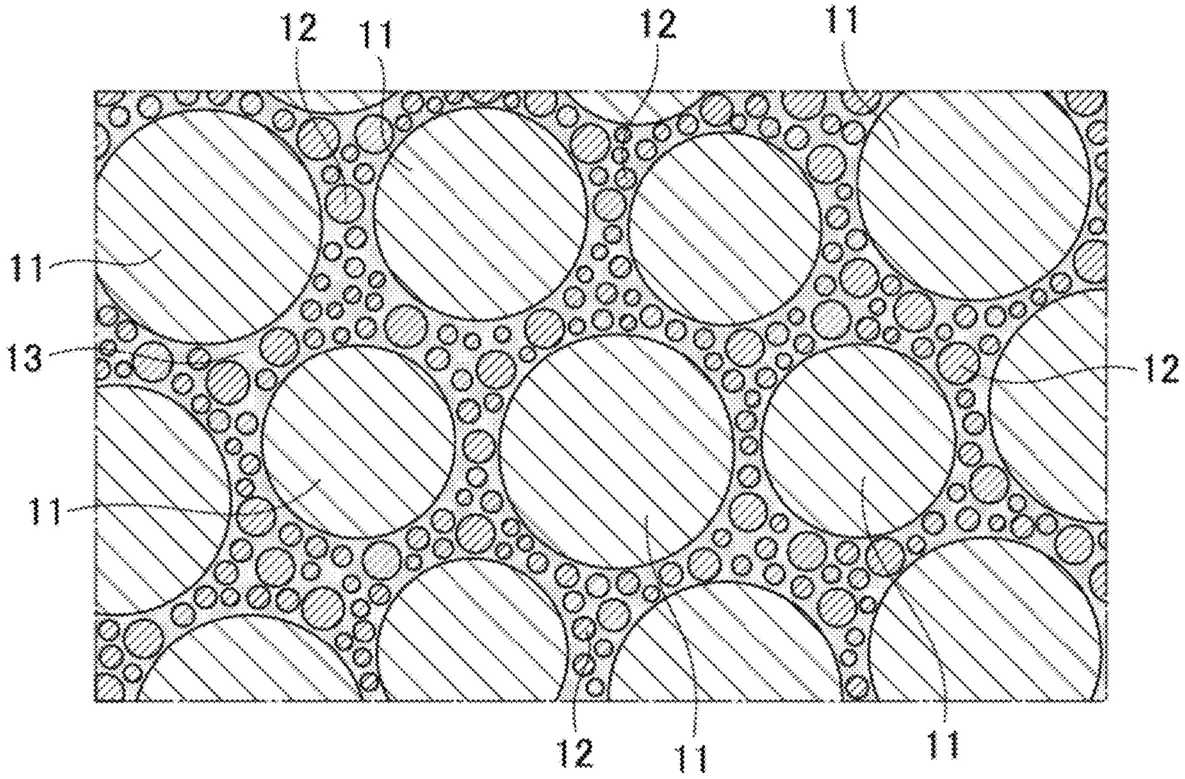
FIG. 2 is an enlarged sectional view schematically showing, on an enlarged scale, a sectional surface of a magnetic base body of the coil component shown in FIG. 1.

Next, the base body 10 which is magnetic will be further described with reference to FIG. 2. FIG. 2 is an enlarged sectional view schematically showing, on an enlarged scale, a sectional surface of the base body 10. As shown in the drawing, the base body 10 contains a plurality of first metal magnetic particles 11, a plurality of second metal magnetic particles 12, and a binder 13. The binder 13 binds together the plurality of first metal magnetic particles 11 and the plurality of second metal magnetic particles 12. In other words, the base body 10 is formed of the binder 13 and the plurality of first metal magnetic particles 11 and the plurality of second metal magnetic particles 12 bound to each other by the binder 13. The base body 10 may contain a dielectric material as a magnetic material or a non-magnetic material.

The plurality of first metal magnetic particles 11 have a larger average particle size than the plurality of second metal magnetic particles 12. That is, the average particle size of the plurality of first metal magnetic particles 11 (hereinafter referred to as the first average particle size) is different from the average particle size of the plurality of second metal magnetic particles 12 (hereinafter referred to as the second average particle size). For example, the first average particle size is 30 μm, and the second average particle size is 2 μm, but these are not limitative. In one embodiment of the present invention, the base body 10 may further contain a plurality of third metal magnetic particles (not shown) having an average particle size different from the first average particle size and the second average particle size (the average particle size of the third metal magnetic particles is hereinafter referred to as the third average particle size). The third average particle size may be smaller than the first average particle size and larger than the second average particle size, or it may be smaller than the second average particle size. The first metal magnetic particles 11, the second metal magnetic particles 12, and the third metal magnetic particles contained in the magnetic base body 10 may be hereinafter collectively referred to as "the metal magnetic particles" when they need not be distinguished from one another.

The first metal magnetic particles 11 and the second metal magnetic particles 12 can be formed of various soft magnetic materials. For example, a main ingredient of the first metal magnetic particles 11 is Fe. Specifically, the first metal magnetic particles 11 are particles of (1) a metal such as Fe or Ni, (2) a crystalline alloy such as an alloy containing Fe, Si, and Cr, an alloy containing Fe, Si, and Al, or an alloy containing Fe and Ni, (3) an amorphous alloy such as an alloy containing Fe, Si, Cr, B, and C or an alloy containing Fe, Si, Cr, and B, or (4) a mixture thereof. The composition of the metal magnetic particles contained in the magnetic base body 10 is not limited to those described above. The first metal magnetic particles 11 may contain, for example, 85 wt % or more Fe. This provides the magnetic base body 10 with an excellent magnetic permeability. The composition of the second metal magnetic particles 12 is either the same as or different from that of the first metal magnetic particles 11. When the magnetic base body 10 contains the plurality of third metal magnetic particles (not shown), the composition of the third metal magnetic particles is either the same as or different from that of the first metal magnetic particles 11, as with the second metal magnetic particles 12.

The surfaces of the metal magnetic particles may be coated with insulating films (not shown). The insulating films are formed of, for example, a glass, a resin, or other materials having a high insulating property. For example, the insulating films are formed on the surfaces of the first metal magnetic particles 11 by mixing the first metal magnetic particles 11 with powder of a glass material in a friction mixer (not shown). The insulating films formed of the glass material are adhered to the surfaces of the first metal magnetic particles 11 by the compression friction action in the friction mixer. The glass material may contain ZnO and $P_2O_5$. The insulating films may be formed of various glass materials. The insulating films 14 may be formed of alumina powder, zirconia powder, or any other oxide powders having a high insulating property, in place of or in addition to the glass powder. The thickness of the insulating films is, for example, 100 nm or smaller.

The second metal magnetic particles 12 may be coated with different insulating films than the first metal magnetic particles 11. The insulating films may be oxide films formed by oxidation of the second metal magnetic particles 12. The thickness of the insulating films is, for example, 20 nm or smaller. The insulating films may be oxide films formed on the surfaces of the second metal magnetic particles 12 by heat-treating the second metal magnetic particles 12 in the atmosphere. The insulating films may be oxide films containing oxides of Fe and other elements contained in the second metal magnetic particles 12. These insulating films may be iron phosphate films formed on the surfaces of the second metal magnetic particles 12 by placing the second metal magnetic particles 12 into phosphoric acid and stirring. The insulating films of the first metal magnetic particles 11 may be oxide films formed by oxidation of the first metal magnetic particles 11, whereas the insulating films of the second metal magnetic particles 12 may be coating films formed by a method other than oxidation of the second metal magnetic particles 12.

The binder 13 is, for example, a thermosetting resin having a high insulating property. Examples of the binder 13 include an epoxy resin, a polyimide resin, a polystyrene (PS) resin, a high-density polyethylene (HDPE) resin, a polyoxymethylene (POM) resin, a polycarbonate (PC) resin, a polyvinylidene fluoride (PVDF) resin, a phenolic resin, a polytetrafluoroethylene (PTFE) resin, or a polybenzoxazole (PBO) resin. The binder 13 may also be glass or other materials and may contain insulating fillers.

The conductor 25 is formed in a pattern. In the embodiment shown, the conductor 25 is wound around the coil axis Ax (see FIG. 1). When seen from above, the conductor 25 has, for example, an elliptic shape, a meander shape, a linear shape or a combined shape of these. The conductor 25 may have any shape such as a spiral shape.

The conductor 25 is formed by plating with Cu, Ag, or other conductive materials. The entire surface of the conductor 25 other than an end surface 25*a*2 and an end surface 25*b*2 may be coated with an insulating film. As shown, when the conductor 25 is wound around the coil axis Ax for a plurality of turns, each of the turns of the conductor 25 may be separated from adjacent turns. In this arrangement, the base body 10 mediates between the adjacent turns.

The conductor 25 includes a lead-out conductor 25*a*1 at one end portion thereof and a lead-out conductor 25*b*1 at the other end portion thereof. The lead-out conductor 25*a*1 has the end surface 25*a*2 at an end portion thereof, and the lead-out conductor 25*b*1 has the end surface 25*b*2 at an end portion thereof. The lead-out conductor 25*a*1 at one end portion of the conductor 25 is electrically connected to the external electrode 21, and the lead-out conductor 25*b*1 at the other end portion of the conductor 25 is electrically connected to the external electrode 22.

In one embodiment of the present invention, the external electrode 21 extends on a part of the first principal surface 10*a*, the second principal surface 10*b*, the second end surface 10*d*, the first side surface 10*e*, and the second side surface 10*f* of the base body 10. The external electrode 22 extends on a part of the first principal surface 10*a*, the second principal surface 10*b*, the first end surface 10*c*, the first side surface 10*e*, and the second side surface 10*f* of the base body 10. The external electrodes 21, 22 are spaced apart from each other. Shapes and arrangements of the external electrodes 21, 22 are not limited to those in the example shown. Both the lead-out conductor 25*a*1 and the lead-out conductor 25*b*1 lead to the first principal surface (the mounting surface) 10*a* of the base body 10, and the end surface 25*a*2 of the lead-out conductor 25*a*1 and the end surface 25*b*2 of the lead-out conductor 25*b*1 are exposed from the base body 10 through the first principal surface 10*a*. That is, the end surface 25*a*2 of the lead-out conductor 25*a*1 and the end surface 25*b*2 of the lead-out conductor 25*b*1 are exposed from the base body 10 through the same surface. It is also possible that the end surface 25*a*2 of the lead-out conductor 25*a*1 and the end surface 25*b*2 of the lead-out conductor 25*b*1 are exposed from the base body 10 through different surfaces.

Figure 3:
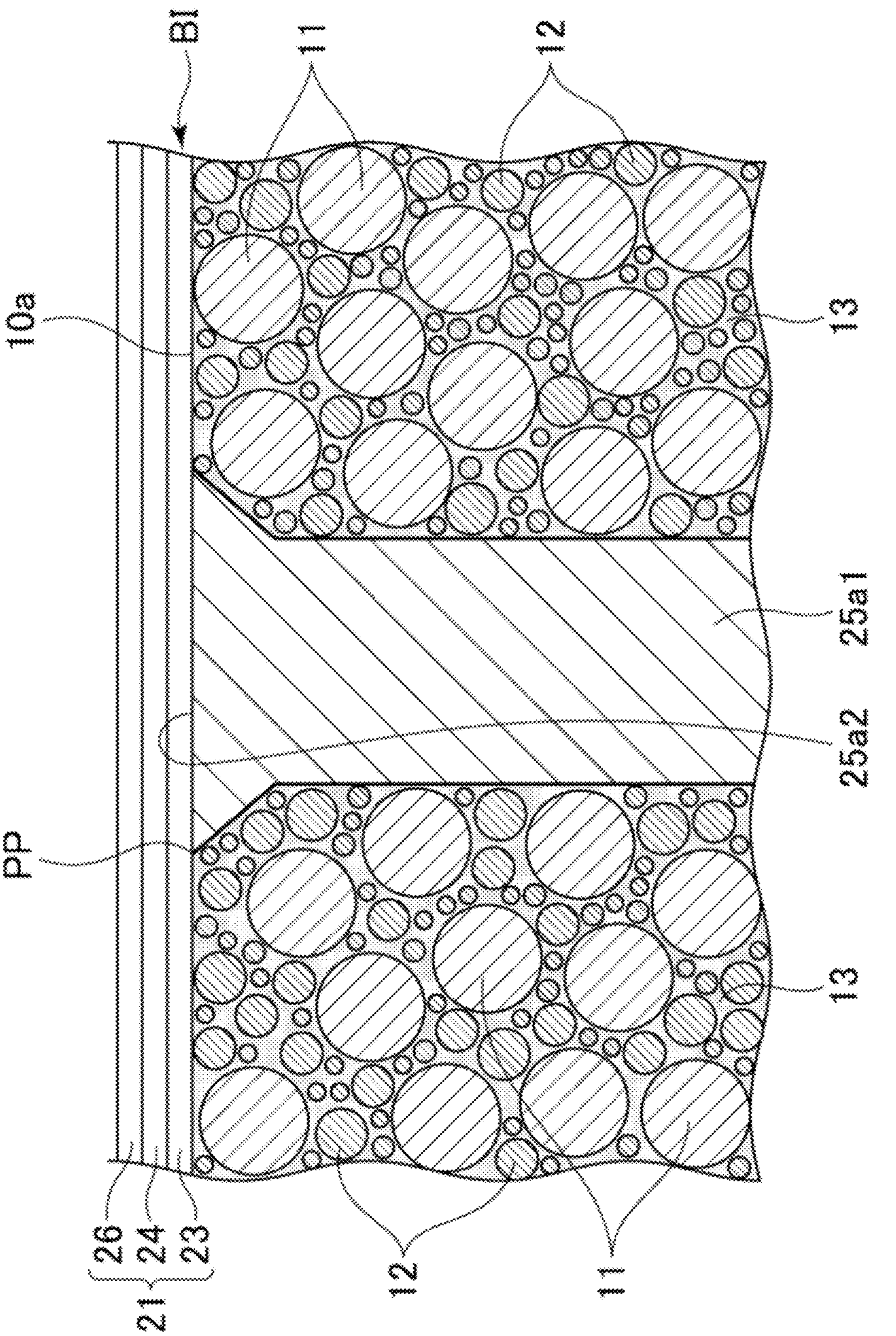
FIG. 3 is an enlarged sectional view showing, on an enlarged scale, a sectional surface around the joint between one end portion of a conductor and an external electrode in the coil component shown in FIG. 1.
Figure 4:
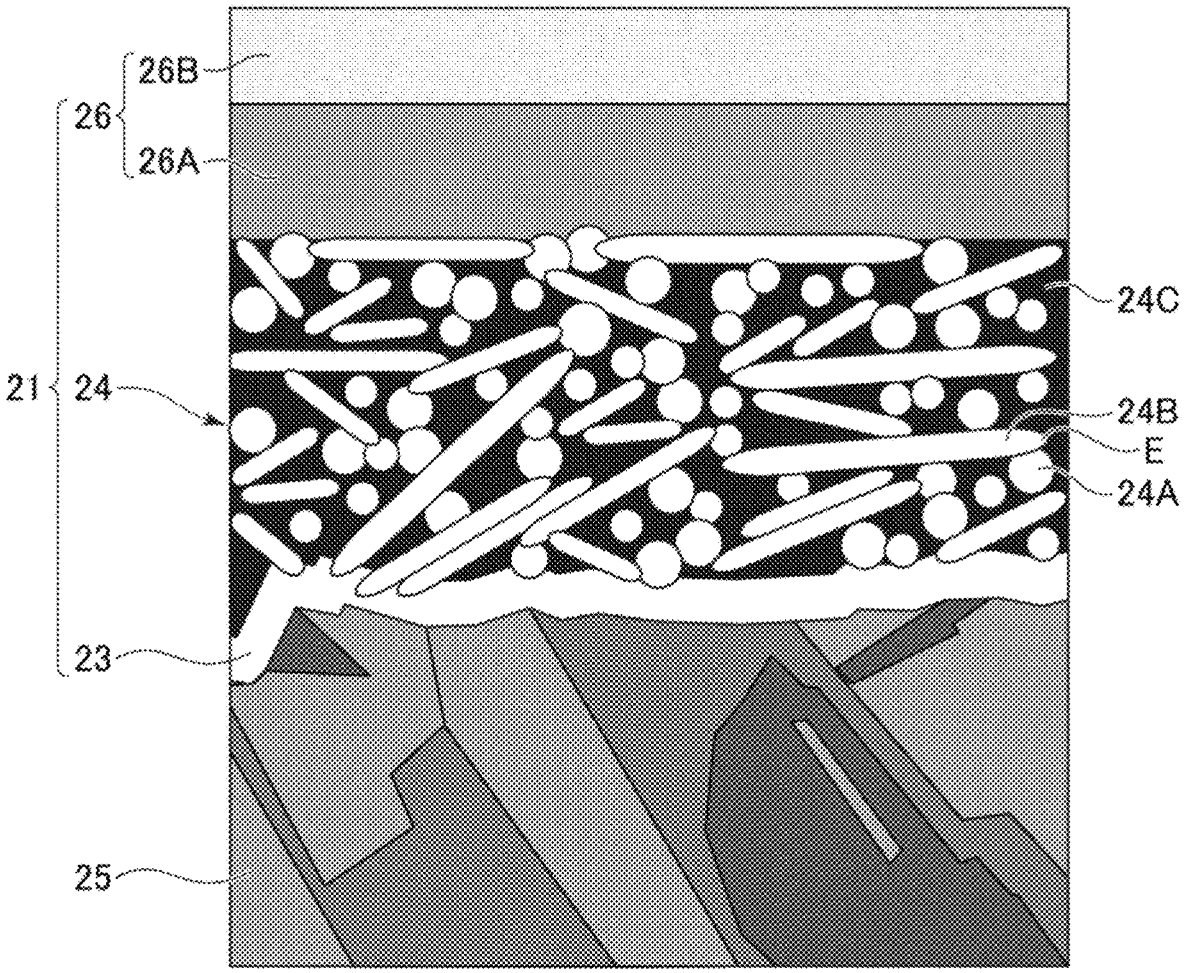
FIG. 4 is a schematic view showing an electron microscopy image of a sectional surface of the external electrode in the coil component shown in FIG. 1.

Next, the external electrodes of the coil component 1 according to one embodiment of the present invention will be hereinafter described with reference to FIGS. 3 and 4. FIG. 3 is an enlarged sectional view showing, on an enlarged scale, a sectional surface around the joint between one end portion of the conductor 25 and the external electrode 21 in the coil component 1 shown in FIG. 1. FIG. 4 is a schematic view showing an electron microscopy image of a sectional surface of the external electrode in the coil component shown in FIG. 1. The following description on the external electrode 21 also applies to the external electrode 22 unless in specific cases. Also, FIGS. 3 and 4, which show the external electrode 21, also apply to the external electrode 22. As shown in FIGS. 3 and 4, the external electrode 21 includes a metal film 23, an electrode layer 24, and a plating layer 26.

The metal film 23 is, for example, a sputtering film, and at least a part of the metal film 23 and at least a part of one end portion of the conductor 25 (the end surface 25*a*2) are connected with each other by metallic bond. The phrase "at least a part of one end portion of the conductor 25" mentioned here refers to some region of the end surface 25*a*2. For example, the metal film 23 and the end portion 25*a*1 may be connected with each other by metallic bond at a peripheral portion PP of the end surface 25*a*2 (see FIG. 3). FIG. 3 shows an example in which the metal film 23 and the end portion 25*a*1 of the conductor 25 are connected with each other by metallic bond at the entirety of the end surface 25*a*2. In the example shown in FIG. 3, the region of the end surface 25*a*2 at which the metal film 23 and the end portion 25*a*1 are metal-bonded to each other includes the peripheral portion PP.

The metal film 23 is made of, for example, a metal such as Ag, Au, Pd, Pt, Cu, Ni, Ti, and Ta or an alloy of these metals. Metals suitable for the metal film 23 are those less apt to oxidation or ready to be reduced after oxidation. The metal film 23 is preferably made of a material having a low volume resistivity. The thickness of the metal film 23 is not particularly limited but may be, for example, 1 μm to 5 μm. The ionization tendency of the main ingredient of the metals contained in the metal film 23 is preferably smaller than that of the metal constituting the conductor 25. The phrase "the main ingredient of the metals contained in the metal film 23" refers to the metal ingredient that makes up more than a half of the metal species by weight percent among the metals contained in the metal film 23. When the metal film 23 contains one metal, this metal is the main ingredient. By way of one example, when the conductor 25 is made of Cu, the metal contained in the metal film 23 may be Ag.

The average of the aspect ratios of the metal particles contained in the metal film 23 is 0.8 to 1.5. An aspect ratio of a metal particle contained in the metal film 23 is $\beta/\alpha$, where $\alpha$ is the dimension of the metal particle in the direction horizontal to the boundary interface BI, and $\beta$ is the dimension of the metal particle in the direction perpendicular to the boundary interface BI. The average of the aspect ratios of the metal particles may be an average of the aspect ratios of, for example, five, ten, or other plural number of metal particles. The metal particles contained in the metal film 23 are metal-bonded to each other.

The electrode layer 24 is disposed on the metal film 23 and electrically connected to one end portion of the conductor 25. The electrode layer 24 has a thickness of, for example, about 20 μm to 50 μm. The electrode layer 24 contains a plurality of first fillers 24A, a plurality of second fillers 24B, and a resin 24C. Each of the plurality of first fillers 24A has a spherical shape with an aspect ratio of 2 or smaller. Each of the plurality of second fillers 24B has a flat shape with an aspect ratio of 3 or larger. The aspect ratios mentioned herein refer to a ratio of the dimension in the short axis direction to the dimension in the long axis direction (that is, a value obtained by dividing the maximum particle size by the minimum particle size) in the sectional surface of the electrode layer 24 in the thickness direction thereof. In the sectional surface of the electrode layer 24 in the thickness direction thereof, the average of the maximum particle sizes of the second fillers 24B is larger than the average of the maximum particle sizes of the first fillers 24A. The average of the maximum particle sizes of the first fillers 24A is, for example, 1 μm to 10 μm, and the average of the maximum particle sizes of the second fillers 24B is, for example, 0.1 μm to 10 μm. The volume ratio between the first fillers 24A and the second fillers 24B contained in the electrode layer 24 is, for example, 3:7 to 7:3. The first fillers 24A and the second fillers 24B are formed of a metal having a high electrical conductivity such as Ag, Cu, Au, Pd, or Ni. Further, the first fillers 24A and the second fillers 24B contain a same metal as an ingredient. In the embodiment shown, both the first fillers 24A and the second fillers 24B are formed of Ag. It is also possible that the first fillers 24A and the second fillers 24B contain different metals, or the first fillers 24A and the second fillers 24B are formed only of different metals. Even when the first fillers 24A and the second fillers 24B contain different metals, the first fillers 24A and the second fillers 24B are metal-bonded to each other, and the bonding portion between the first fillers 24A and the second fillers 24B are alloyed. In this case, the combination of the metal contained in the first fillers 24A and the metal contained in the second fillers 24B is preferably selected such that the bond strength is larger than that of the metallic bond between the same metals. The bond strength of an alloy made by a combination of different metals is apparent in known literatures.

The first fillers 24A and the second fillers 24B of the electrode layer 24 undergo heat treatment in the manufacturing process of the coil component 1. This causes the first fillers 24A and the second fillers 24*b* to be metal-bonded to each other. The electrode layer 24 may include portions in which the second fillers 24B are metal-bonded to each other with the long axes thereof oriented parallel to each other. The electrode layer 24 may include portions in which the first fillers 24A are metal-bonded to each other. In the interface between the electrode layer 24 and the metal film 23, the second fillers 24B are metal-bonded to the metal film 23. This causes the electrode layer 24 to be electrically connected to the metal film 23. Further, in the interface between the electrode layer 24 and the plating layer 26, the second fillers 24B are metal-bonded to the plating layer 26. The long axis direction of each second filler 24B is substantially parallel to the direction perpendicular to the thickness direction of the electrode layer 24. This causes the electrode layer 24 to be electrically connected to the plating layer 26. Likewise, the first fillers 24A may be metal-bonded to the metal film 23. Also, the first fillers 24A may be metal-bonded to the plating layer 26.

The resin 24C contained in the electrode layer 24 is, for example, a thermosetting resin. Examples of the thermosetting resin include epoxy resin, acrylic resin, and polyimide resin. The proportion of the resin 24C in the electrode layer 24 is 65 vol % or smaller. The proportion of the resin 24C in the electrode layer 24 is preferably 30 to 65 vol %. Further, the proportion of the resin 24C in the electrode layer 24 is more preferably smaller than 30 vol %.

The electrode layer 24 is formed from a conductive paste that contains first metal particles to be the first fillers 24A, second metal particles to be the second fillers 24B, and an unset resin. The first metal particles and the second metal particles are the first fillers 24A and the second fillers 24B, respectively, yet to be metal-bonded by the heat treatment in the manufacturing process of the coil component 1. Each of the second metal particles has a flat shape, and the curvature of the outer shape of each second metal particle is smallest at the opposite end portions E in the respective long axis direction. The average of the minimum radii of curvature of the second metal particles (that is, the curvatures of the end portions of the second metal particles in the respective long axis directions) is equal to or smaller than that of the first metal particles of 0.5 μm. By way of one example, the average of the minimum radii of curvature of the second metal particles is 0.1 μm or smaller. In FIG. 4, the end portions of the second fillers 24B metal-bonded by the heat treatment are denoted as the end portions E of the second metal particles. FIG. 4 schematically shows the boundaries of the end portions of the second fillers 24B that are metal-bonded. The boundaries of the end portions of the second fillers 24B can be sighted by, for example, observing a sectional surface of the electrode layer 24 including the second fillers 24B under an electron microscope at a magnification of 50,000. In actual observations, the boundaries of the end portions of the second fillers 24B may not be observed clearly. For example, when an end portion of a second filler 24B is bonded to a first filler 24A or another second filler 24B, the boundary may not be observed clearly. In such a case, the boundary of the second filler 24*b* may be set at the boundary of the crystal grains in the second filler 24B that can be observed under an electron microscope. When the boundary of the crystal grains in the second filler 24B cannot be observed clearly, the boundary of the end portion of the second filler 24B may be set at a curved line estimated by any known estimation method from the shape of a portion of the second filler 24B other than the end portion that cannot be observed clearly.

The plating layer 26 is disposed on the electrode layer 24. In the embodiment shown, the plating layer 26 has multilayer structure including a first plating layer 26A and a second plating layer 26B. The first plating layer 26A contacts with the electrode layer 24, and the second plating layer 26B is disposed on the first plating layer 26A. The first plating layer 26A has a thickness of, for example, 5 μm to 7 μm, and the second plating layer 26B has a thickness of, for example, 5 μm to 10 μm. The first plating layer 26A is formed of Ni, and the second plating layer 26B is formed of Sn. The plating layer 26 may also be a single-layer plating layer formed of Ni or Sn.

Next, a description is given of a manufacturing method of the coil component 1 according to one embodiment of the invention. First, the conductor 25 formed of a metal material or the like and having a coil shape is placed into a mold, along with a mixed resin composition prepared by mixing and kneading particles including the first metal magnetic particles 11 and the second metal magnetic particles 12 with the binder 13 composed of a resin or the like. The work is then compression molded such that the end surface 25*a*2 of the lead-out conductor 25*a*1 and the end surface 25*b*2 of the lead-out conductor 25*b*1 of the conductor 25 are exposed through the surface. The coil shape of the conductor 25 is not particularly limited. For example, the conductor 25 is made of a wire wound in a spiral shape, or it may be made of a planar coil instead of the wound wire. The conductor 25 may have an insulating coat. The resin in the molded product is cured to obtain the base body 10 having the conductor 25 embedded therein.

Next, the surface of the magnetic base body 10 in which the end surface 25*a*2 of the lead-out conductor 25*a*1 and the end surface 25*b*2 of the lead-out conductor 25*b*1 of the conductor 25 are exposed is smoothed to remove oxides. By way of an example, the surface of the magnetic base body 10 may be polished with an abrasive and then subjected to plasma etching. The particle size of the abrasive should preferably be smaller than that of the first metal magnetic particles 11. For example, when the average particle size of the first metal magnetic particles 11 is 30 μm, an abrasive having a particle size of 25 μm is selected. Any etching method, such as plasma etching, is available that can remove oxides from the surface of the magnetic base body.

Next, the metal film 23 is formed. One example of the method of forming the metal film 23 is sputter deposition, or in particular, high density sputter deposition. In high density sputter deposition, a large electric power is applied for a short period to form a dense film while preventing overheating of the sputtered film. The sample may be cooled during sputtering, such that a larger electric power can be applied to form more dense sputtered film. With the above metals used in this method, the metal film 23 can be formed efficiently at a high sputtering yield. The metal film formed by sputter deposition is herein referred to as a sputtered film. The metal film 23 may alternatively be formed by methods other than sputter deposition capable of metal-bonding the end surface 25*a*2 of the conductor 25 to the metal film 23.

Next, the electrode layer 24 is formed on the metal film 23. The first step to form the electrode layer 24 is to prepare a conductive paste that contains first metal particles to be the first fillers 24A and second metal particles to be the second fillers 24B. The next step is to form a layer of the conductive paste by printing or other method. A heat treatment or other process follows to metal-bond the first metal particles and the second metal particles contained in the layer of the conductive paste. By way of one example, the heat treatment is performed under the conditions of 170 to 250° C. and 30 to 60 minutes. In addition, the heat treatment is performed in a low-oxygen or reducing atmosphere, depending on the substances of the first fillers 24A and the second fillers 24B. Through these steps, the electrode layer 24 is formed that is electrically connected to the end portion of the conductor 25 via the metal film 23.

Lastly, plating is performed to form the first plating layer 26A and the second plating layer 26B. Through the process described above, the external electrodes 21, 22 are formed, and thus the coil component 1 is manufactured. The coil component 1 manufactured is mounted on the circuit board by soldering the external electrodes 21, 22 to the corresponding land portions of the circuit board.

As described above, the external electrodes 21, 22 of the coil component 1 include the electrode layer 24 containing the plurality of first fillers 24A, the plurality of second fillers 24B, and the resin 24C. Each of the plurality of second fillers 24B has a flat shape. In the sectional surface of the electrode layer 24 in the thickness direction thereof, the average of the maximum particle sizes of the second fillers 24B is larger than the average of the maximum particle sizes of the first fillers 24A. Since the second fillers 24B have a relatively large particle size, the second fillers 24B are less prone to aggregate when metal-bonded by the heat treatment. Further, since each second filler 24B has a flat shape, the curvature of each second filler 24B is small at the opposite end portions E thereof in the respective long axis direction and is large at the middle portion thereof in the respective long axis direction. Therefore, the amount of energy required for the metallic bond by the heat treatment is small at the opposite end portions E of each second filler 24B in the respective long axis direction and is large at the middle portion thereof in the respective long axis direction. Accordingly, the bonding by the metallic bond is facilitated at the opposite end portions E of each second filler 24B in the respective long axis direction and is retarded at the middle portion thereof in the respective long axis direction. This makes it possible to inhibit the first fillers 24A and the second fillers 24B from aggregating when metal-bonded by the heat treatment, while ensuring the electric connection by the opposite end portions E of each second filler 24B in the respective long axis direction. As a result, the first fillers 24A and the second fillers 24B are inhibited from being unevenly distributed in the electrode layer 24, and thus the reduction of the strength of the first fillers 24A and the second fillers 24B can be inhibited.

Each of the external electrodes 21, 22 includes the metal film 23 disposed between the electrode layer 24 and the end portion of the conductor 25, and the metal film 23 may be metal-bonded to the second fillers 24B. This reduces the electrical resistance between the metal film 23 and the electrode layer 24.

Each of the external electrodes 21, 22 includes the plating layer 26 disposed on the electrode layer 24, and the plating layer 26 may be metal-bonded to the second fillers 24B. This reduces the electrical resistance between the plating layer 26 and the electrode layer 24.

The long axis direction of each second filler 24B may be substantially parallel to the direction perpendicular to the thickness direction of the electrode layer 24. This enlarges the contact areas between the second fillers 24B and the plating layer 26 and the contact areas between the second fillers 24B and the metal film 23, and therefore, the electrical resistance can be further reduced between the plating layer 26 and the electrode layer 24 and between the metal film 23 and the electrode layer 24.

The second fillers 24B may be metal-bonded to each other with the long axes thereof oriented parallel to each other. This enlarges the contact areas between the second fillers 24B, and therefore, the electrical resistance in the electrode layer 24 can be reduced.

Figure 5:
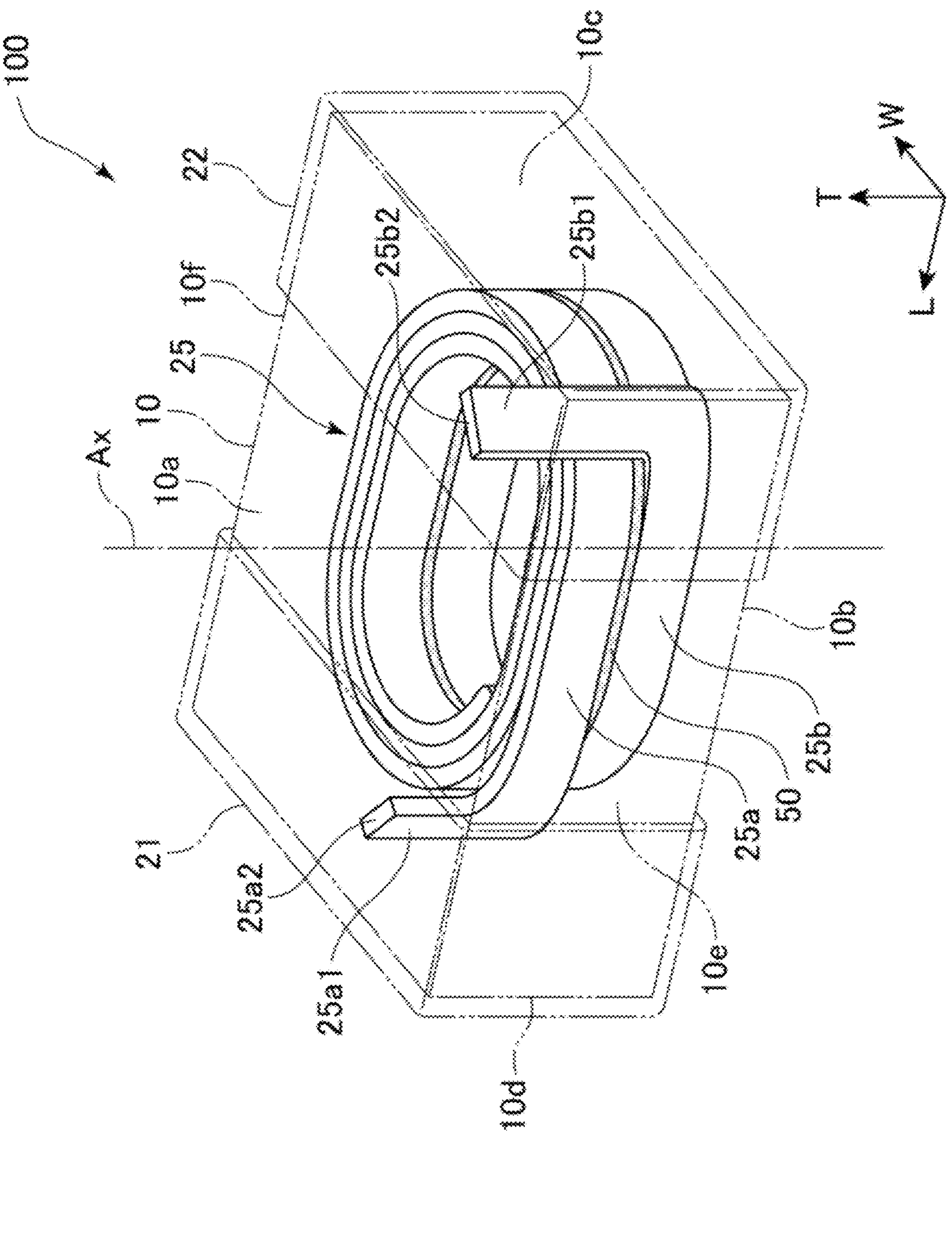
FIG. 5 is a perspective view schematically showing a coil component according to another embodiment of the present invention.

Next, a description is given of a coil component 100 according to another embodiment of the present invention with reference to FIG. 5. FIG. 5 is a perspective view schematically showing the coil component 100. As shown, similarly to the coil component 1, the coil component 100 includes a coil conductor 25 provided in the base body 10, an external electrode 21 disposed on a surface of the base body 10, and an external electrode 22 disposed on the surface of the base body 10 at a position spaced apart from the external electrode 21. The coil component 100 is different from the coil component 1 in that it includes an insulating plate 50 and two conductors 25. The insulating plate 50 is provided in the base body 10, and the two conductors 25 are provided on the top-side surface and the bottom-side surface of the insulating plate 50, respectively.

As in the coil component 1, the external electrodes 21, 22 of the coil component 100 include the electrode layer 24 containing the plurality of first fillers 24A, the plurality of second fillers 24B, and the resin 24C. Each of the plurality of second fillers 24B has a flat shape. In the sectional surface of the electrode layer 24 in the thickness direction thereof, the average of the maximum particle sizes of the second fillers 24B is larger than the average of the maximum particle sizes of the first fillers 24A. For the same reason as in the coil component 1, this makes it possible to inhibit the first fillers 24A and the second fillers 24B from aggregating when metal-bonded by the heat treatment, while ensuring the electric connection by the opposite end portions E of each second filler 24B in the respective long axis direction. As a result, the first fillers 24A and the second fillers 24B are inhibited from being unevenly distributed in the electrode layer 24, and thus the reduction of the strength of the first fillers 24A and the second fillers 24B can be inhibited.

The dimensions, materials, and arrangements of the constituent elements described for the above various embodiments are not limited to those explicitly described for the embodiments, and these constituent elements can be modified to have any dimensions, materials, and arrangements within the scope of the present invention. Furthermore, constituent elements not explicitly described herein can also be added to the above-described embodiments, and it is also possible to omit some of the constituent elements described for the embodiments.

For example, the external electrodes 21, 22 of the coil component 1 and the coil component 100 may not include the metal film 23. In this case, the electrode layer 24 and the end portion of the conductor 25 may be directly connected to each other. Further, the external electrodes 21, 22 may not include the plating layer 26.

What is claimed is:

1. A coil component comprising:

a base body;

a conductor wound around a coil axis; and an external electrode provided on a surface of the base body and electrically connected to an end portion of the conductor, wherein the external electrode includes an electrode layer containing a plurality of first fillers, a plurality of second fillers, and a resin, wherein at least one of the plurality of second fillers is bonded by metallic bond to at least adjacent one of the plurality of first fillers and/or at least adjacent one of the plurality of second fillers, wherein each of the plurality of second fillers has a flat shape, wherein one end of each of said at least one of the plurality of second fillers is in direct contact with and bonded by metallic bond to said at least adjacent one of the plurality of first fillers and/or said at least adjacent one of the plurality of second fillers, wherein the plurality of first fillers consist of at least one element selected from the group consisting of Ag, Cu, Au, Pd, and Ni, and wherein the plurality of second fillers consist of at least one element selected from the group consisting of Ag, Cu, Au, Pd, and Ni.

2. The coil component of claim 1, wherein said one end of each of said at least one of the plurality of second fillers is in direct contact with one end of said at least adjacent one of the plurality of second fillers.

3. The coil component of claim 1, wherein each of the plurality of second fillers has an aspect ratio of 3 or larger.

4. The coil component of claim 1, wherein in a sectional surface of the electrode layer in a thickness direction thereof, an average of maximum particle sizes of the plurality of second fillers is larger than an average of maximum particle sizes of the plurality of first fillers.

5. The coil component of claim 4, wherein the average of maximum particle sizes of the plurality of first fillers ranges from 1 μm to 10 μm.

6. The coil component of claim 4, wherein the average of maximum particle sizes of the plurality of second fillers ranges from 0.1 μm to 10 μm.

7. The coil component of claim 1, wherein each of the plurality of first fillers has a spherical shape with an aspect ratio of 2 or smaller.

8. The coil component of claim 1, wherein the external electrode includes a metal film provided between the electrode layer and the end portion of the conductor, and wherein the metal film is metal-bonded to at least adjacent one of the plurality of second fillers.

9. The coil component of claim 1, wherein the external electrode includes a plating layer provided on the electrode layer, and wherein the plating layer is metal-bonded to at least adjacent one of the plurality of second fillers.

10. The coil component of claim 1, wherein a long axis direction of each of the plurality of second fillers is substantially parallel to a direction perpendicular to a thickness direction of the electrode layer.

11. The coil component of claim 1, wherein a proportion of the resin in the electrode layer is 65 vol % or smaller.

12. The coil component of claim 1, wherein the electrode layer is formed from a conductive paste containing first metal particles to be the plurality of first fillers and second metal particles to be the plurality of second fillers, and wherein an average of minimum radii of curvature of the second metal particles is smaller than an average of minimum radii of curvature of the first metal particles.

13. The coil component of claim 12, wherein the average of minimum radii of curvature of the second metal particles is 0.1 μm or smaller.

14. The coil component of claim 1, wherein a thickness of the electrode layer ranges from 20 μm to 50 μm.

15. The coil component of claim 8, wherein said one end of each of said one or more of the plurality of second fillers are surrounded by the metal film.

16. The coil component of claim 1, wherein the plurality of first fillers contain the metal that is contained in the plurality of second fillers.

17. The coil component of claim 1, wherein the plurality of first fillers contain another kind of metal that is contained in the plurality of second fillers.

18. A circuit board comprising the coil component of claim 1.

19. An electronic device comprising the circuit board of claim 18.

* * * * *